(No Model.)

W. G. FORD.
VEHICLE AXLE POINT.

No. 542,883. Patented July 16, 1895.

WITNESSES
Franck L. Ourand.
Rose E. Robbitt.

INVENTOR
W. G. Ford
John S. Duffie. Attorney.

UNITED STATES PATENT OFFICE.

WILLIAM GARDNER FORD, OF TYLER, TEXAS.

VEHICLE-AXLE POINT.

SPECIFICATION forming part of Letters Patent No. 542,883, dated July 16, 1895.

Application filed September 5, 1894. Serial No. 522,198. (No model.)

*To all whom it may concern:*

Be it known that I, WILLIAM GARDNER FORD, a citizen of the United States, residing at Tyler, in the county of Smith and State of Texas, have invented certain new and useful Improvements in Vehicle-Axle Points; and I do hereby declare the following to be a full, clear, and exact description of the invention, such as will enable others skilled in the art to which it appertains to make and use the same.

My invention is a vehicle-axle point.

Where axle-points on buggies or other vehicles become badly worn, they always have to be replaced by short arms, which are welded onto the axle. My invention does away with this expense, trouble, and unsatisfactory manner of repairing the axle, unsatisfactory because the welding, especially in country shops, is often not well done and the point breaks off.

My invention consists of a thimble that is to be shrunk, pressed, or fastened onto the axle by clips, bolts, or set-screws. This invention obviates the necessity of taking off the points. The thimble may be made of any suitable material; but I prefer making it of steel. It is made about one-eighth of an inch thick.

Figure 1:
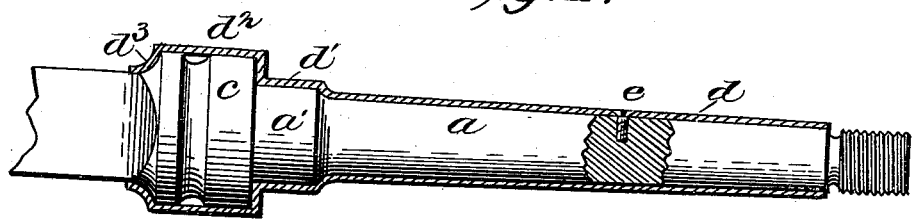
Figure 2:
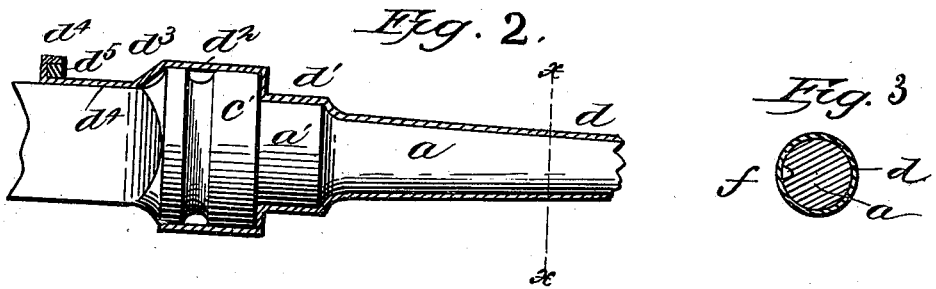
Figure 3:
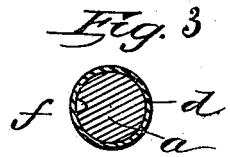

In the accompanying drawings, Figure 1 is a longitudinal sectional view of my invention secured to an axle-point, being secured thereto by means of a screw passing through the thimble into the axle and having the collar bent down to fit the axle beyond or inside of the shoulder. Fig. 2 is a longitudinal sectional view of my invention secured to an axle-point, part of its end cut off, secured to the axle by means of a clip. Fig. 3 is a cross-sectional view on the line $x\ x$ of Fig. 2.

My invention is described as follows:

$a$ is the axle-point; $a'$, the enlargement of said axle-point.

$c$ is the shoulder not threaded.

$d$ is the thimble.

$d'$ is the enlarged part of the thimble to cover the enlargement $a'$.

$d^2$ is the flange of the thimble. The flange $d^2$ extends back and over the enlargements or shoulders of the axle and has a shrunken or bent-down part $d^3$, which is made to fit closely around the square part of the axle. This part $d^3$ may be made to thus fit by any known mechanical means. Said thimble may be further secured to the axle by means of a screw $e$, passing through the thimble into the axle-point $a$.

Fig. 2 is a modification of the invention, as shown in Fig. 1, in which case there extends from the flange $d^2$ an arm $d^4$, which is turned up at its rear end. Said arm is secured to the axle by means of a clip $d^5$.

$f$ is an oil-groove, and $g$ is the nut.

Having described my invention, what I claim as new, and desire to secure by Letters Patent, is—

1. A vehicle axle point, consisting of a thimble adapted to fit over and around an axle point, and having an enlargement $d'$, to fit over the enlargement $a'$, of the axle; a flange $d^2$, to extend over the shoulders of said axle; and flange $d^3$, adapted to be bent down around the square part of the axle, substantially as shown and described and for the purposes set forth.

2. A vehicle axle point, consisting of a thimble adapted to fit over and around an axle point, and having an enlargement $d'$, to fit over the enlargement $a'$, of the axle; a flange $d^2$, to extend over the shoulders of said axle; and flange $d^3$, adapted to be bent down around the square part of the axle, a portion of said shrunken part extending back on the face of said axle and adapted to be secured thereto, substantially as shown and described and for the purposes set forth.

In testimony whereof I affix my signature in presence of two witnesses.

WILLIAM GARDNER FORD.

Witnesses:
CLAY HIGHT,
CARY B. EPES.